(12) United States Patent
Ishikawa et al.

(10) Patent No.: US 6,209,913 B1
(45) Date of Patent: Apr. 3, 2001

(54) AXLE PIVOT CONTROL APPARATUS FOR INDUSTRIAL VEHICLES

(75) Inventors: Kazuo Ishikawa; Kuniharu Nogawa, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/204,120

(22) Filed: Dec. 2, 1998

(30) Foreign Application Priority Data

Dec. 4, 1997 (JP) .................................................... 9-334452

(51) Int. Cl.$^7$ ................................. B60R 21/00; B66F 9/00
(52) U.S. Cl. ........................... 280/755; 340/440; 414/636
(58) Field of Search ........................ 280/5.508, 124.112, 280/754, 755; 340/440, 815.67; 414/636

(56) References Cited

U.S. PATENT DOCUMENTS

| | | | | |
|---|---|---|---|---|
| 2,317,029 | * | 4/1943 | Claytor | 340/815.67 |
| 3,937,339 | * | 2/1976 | Geis et al. | 280/124.112 |
| 4,511,974 | * | 4/1985 | Nakane et al. | 414/636 |
| 4,661,796 | * | 4/1987 | Hirano | 340/458 |
| 4,845,481 | * | 7/1989 | Havel | 340/815.67 |
| 5,011,358 | * | 4/1991 | Andersen et al. | 414/636 |
| 5,513,875 | * | 5/1996 | Tahara et al. | 280/754 |
| 5,639,119 | * | 6/1997 | Plate et al. | 280/124.112 |
| 5,749,696 | * | 5/1998 | Johnson | 414/636 |
| 5,813,697 | * | 9/1998 | Bargenquast et al. | 280/124.112 |
| 5,947,516 | * | 9/1999 | Ishikawa | 280/755 |
| 5,995,001 | * | 11/1999 | Wellman et al. | 340/440 |
| 6,056,501 | * | 5/2000 | Ishikawa et al. | 414/636 |

FOREIGN PATENT DOCUMENTS

| | | | |
|---|---|---|---|
| 58-167215 | 10/1983 | (JP) . | |
| 58-183307 | 10/1983 | (JP) | B60G/25/00 |
| 58-211903 | 12/1983 | (JP) . | |
| 41-84607 | 7/1992 | (JP) | G06F/1/00 |
| 5-286700 | 11/1993 | (JP) . | |
| 9-216799 | 8/1997 | (JP) . | |

* cited by examiner

Primary Examiner—J. J. Swann
Assistant Examiner—Christopher Bottorff
(74) Attorney, Agent, or Firm—Morgan & Finnegan, L.L.P.

(57) ABSTRACT

An industrial vehicle including an axle to which wheels are mounted and supported to pivot vertically relative to a body of the vehicle. The vehicle includes a pivot control apparatus for controlling pivoting of the axle. The industrial vehicle further includes a controller for determining whether an abnormality has occurred in the pivot control apparatus. A warning lamp having two or more different modes is located in the cabin. The modes include an abnormality mode for indicating the occurrence of an abnormality in the pivot control apparatus and a normality mode for indicating normal functioning of the pivot control apparatus. The controller also notifies the operator of two or more additional different pieces of information using the modes of the warning lamp. That is, the single warning lamp also indicates the reason for restricting the axle by its color.

19 Claims, 6 Drawing Sheets

AXLE PIVOT CONTROL APPARATUS FOR INDUSTRIAL VEHICLES

BACKGROUND OF THE INVENTION

The present invention relates to industrial vehicles such as forklifts, and more particularly, to an apparatus for restricting pivoting of a pivotal axle.

Known industrial vehicles, such as forklifts, employ pivotal axles to improve vehicle stability. For example, an axle, to which rear wheels are mounted, is supported pivotally with respect to the body of a forklift. However, if the axle pivots when the forklift turns and tilts the body, this may destabilize the vehicle.

Accordingly, Japanese Unexamined Patent Publication No. 58-211903 proposes a forklift employing an axle pivot control apparatus that restricts pivoting of its axle in accordance with the centrifugal force produced when the forklift turns. The forklift includes a centrifugal force sensor and an apparatus for locking the axle. The sensor detects the centrifugal force applied to the forklift. If the centrifugal force detected by the sensor exceeds a predetermined value, the control apparatus locks the axle to restrict futher pivoting. The axle is thus locked when the forklift turns. This suppresses tilting of the forklift in its lateral direction when the forklift turns and thus maintains vehicle stability.

Japanese Unexamined Patent Publication No. 58-167215 teaches a forklift employing an axle pivot control apparatus that locks the axle in accordance with the weight of the load carried on the forks and the position of the forks.

The axle is locked when the vehicle's center of gravity is raised causing instability of the vehicle. That is, the axle is locked if the forks are lifted to a high position when carrying a heavy load. This keeps the forklift stable when handling loads.

When employing an axle pivot control apparatus such as those described above, the forklift operator should be notified of abnormalites in and actuation of the apparatus. For example, if the operator completely relies on the control apparatus, the operator may continue operation of the forklift even under undesirable circumstances. Alternatively, the operator may become overcautious when unaware of whether the control apparatus has been actuated. In such case, the functions of the axle pivot control apparatus are less effective.

Additionally, in a forklift employing an axle pivot control apparatus that is actuated by more than one factor, the forklift operator should be notified of the factor actuating the control apparatus. For example, if the operator knows whether the axle is locked due to a raised center of gravity or a large centrifugal force, the operator can respond appropriately. This would allow the functions of the control apparatus to be fully effective.

Thus, there are various kinds of information related to the axle pivot control apparatus of which the operator should be notified such as the occurrence of an abnormality, the factor actuating the control apparatus, and the current status of the control apparatus. However, many meters and indicators must be arranged on the instrument panel in addition to the indicators related to the axle pivot control apparatus. This restricts available space and makes it difficult to display all information related to the axle pivot control apparatus. To provide sufficient space, the size of the meters must be minimized. However, this would lower the visibility of the meters and indicators on the instrument panel.

SUMMARY OF THE INVENTION

Accordingly, it is an objective of the present invention to provide an industrial vehicle axle pivot control apparatus that notifies the operator of more than one piece of information related to pivoting of the axle.

To achieve the above objective, the present invention provides an industrial vehicle, including an axle to which wheels are mounted and supported to pivot vertically relative to a body of the vehicle, and a pivot control apparatus for controlling pivoting of the axle. The industrial vehicle further includes a determiner for determining whether an abnormality has occurred in the pivot control apparatus. A warning lamp has two or more different modes. The modes include an abnormality mode for indicating the occurrence of an abnormality in the pivot control apparatus and a normality mode for indicating normal functioning of the pivot control apparatus. A notifier for notifying an operator of two or more different pieces of information using the warning lamp. The warning lamp enters the abnormality mode to indicate the occurrence of an abnormality when the determiner determines that an abnormality has occurred in the pivot control apparatus, and the warning lamp enters the normality mode to indicate normal functioning of the pivot control apparatus when the determiner determines that the pivot control apparatus is functioning normally.

In another aspect of the present invention, a method for controlling axle pivot in an industrial vehicle including an axle to which wheels are mounted and supported to pivot vertically relative to a body of the vehicle is provided. The method includes determining whether an abnormality has occurred in a pivot control apparatus that regulates pivotal motion of the axle and controlling a warning lamp to indicate the occurrence of an abnormality, if an abnormality has occurred, and to indicate normal functioning of the pivot control apparatus when no abnormality has occurred.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment according to the present invention will now be described with reference to the drawings.

Figure 3:
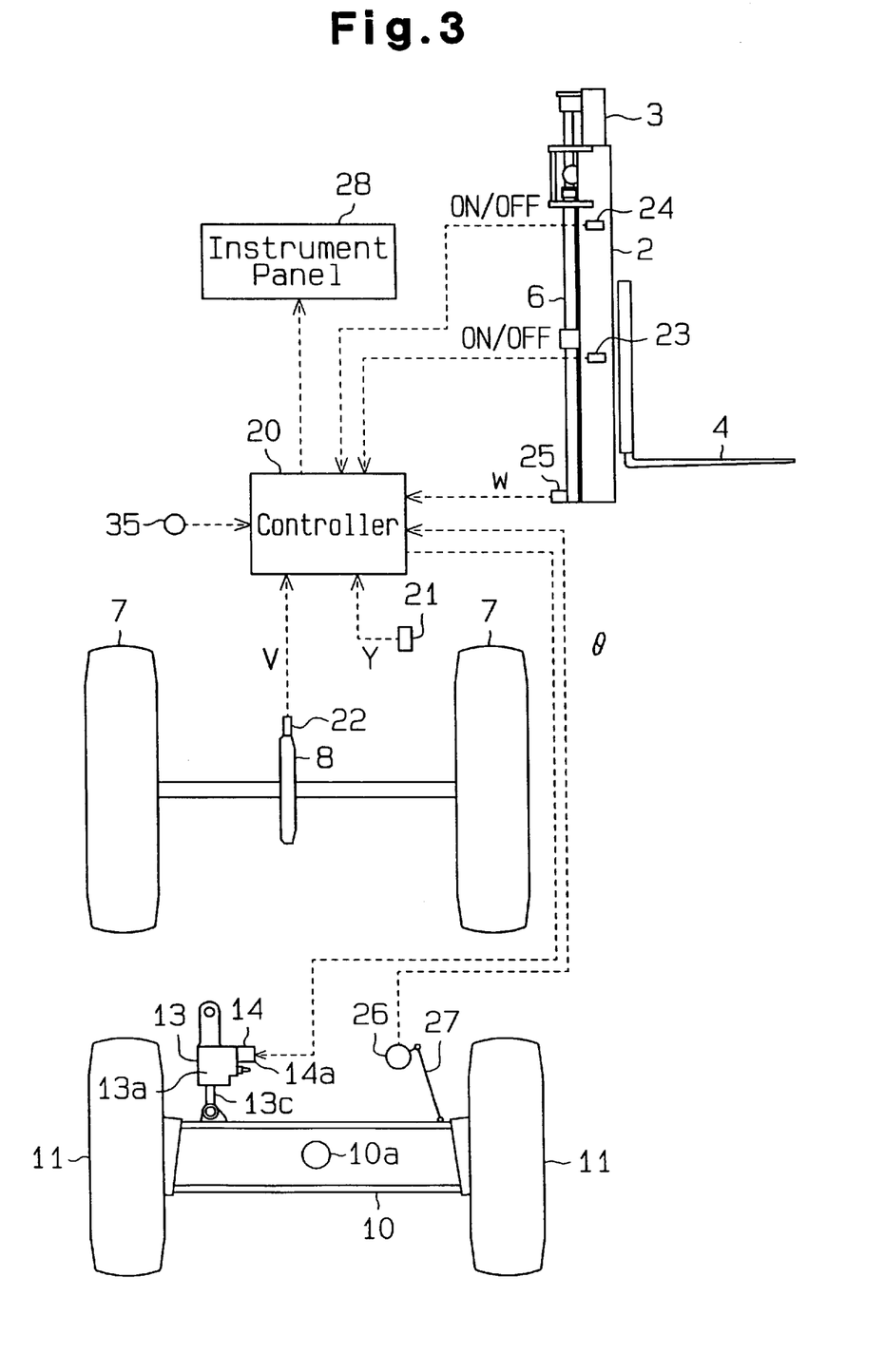
FIG. 3 is a diagrammatic view showing the axle pivot control apparatus according to the present invention.
Figure 4:
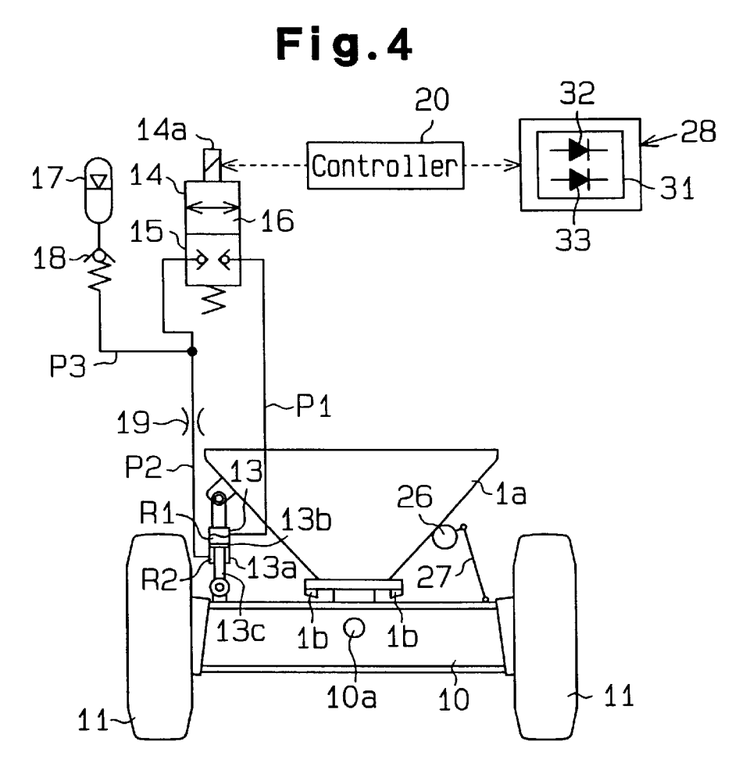
FIG. 4 is a diagrammatic view showing the axle pivot control apparatus according to the present invention.
Figure 5:
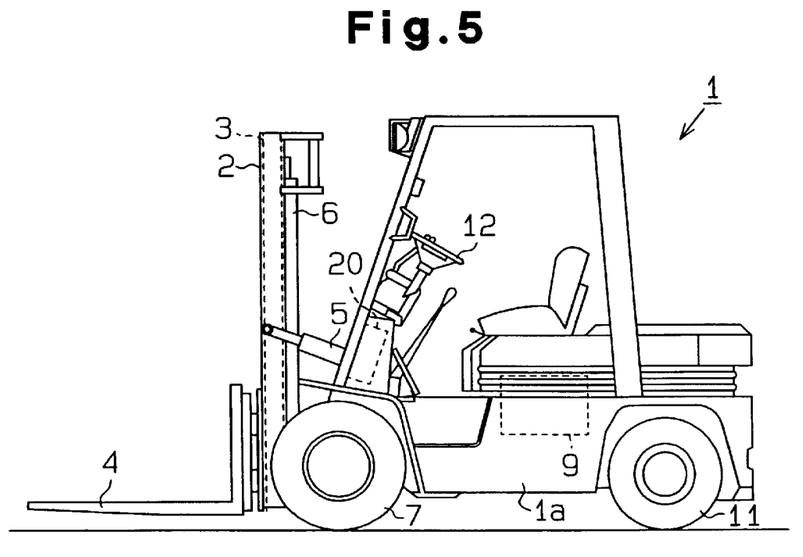
FIG. 5 is a side view showing a forklift to which the present invention is applied.

As shown in FIG. 5, an industrial vehicle, or forklift 1 is a typical front-drive, rear-steer, four-wheel vehicle (two front wheels 7 and two rear wheels 11). Two outer masts 2 are arranged in front of the front wheels 7. The forklift 1 has a body 1a to which each outer mast 1 is inclinably connected by a tilt cylinder 5. Two inner masts 3 are arranged between the outer masts 2. The inner masts 3 are supported by the outer masts 1 such that the inner masts 3 can be lifted and lowered. A fork 4 is supported by each inner mast 3. A sprocket is installed at the upper portion of the inner mast 3 to move the fork 4 along the inner mast As shown in FIG. 3, the front wheels 7 are operably connected to an engine 9 by a differential ring gear 8 and a transmission (not shown). As shown in FIGS. 3 and 4, a rear axle 10, on which the rear wheels 11 are mounted, extends laterally at the rear portion of the body 1a and is pivotal about a center pin 10a. Thus, the rear axle 10 pivots with respect to the body 1a. A pair of stoppers 1b are secured to the lower portion of the body 1a to restrict pivoting of the rear axle 10 within an angular range of ±4°.

As shown in FIG. 4, a hydraulic damper 13 connects the body 1a to the rear axle 10. The damper 13 includes a housing 13a, a piston 13b, and a piston rod 13c. The housing 13a is coupled to the body 1a. The piston rod 13c extends from the piston 13b and is coupled to the rear axle 10. The piston 13b defines a first chamber R1 and a second chamber R2 in the housing 13a. The damper 13 is connected to an electromagnetic switch valve 14 by way of a first passage P1 and a second passage P2. The first passage P1 is connected with the first chamber R1, while the second passage P2 is connected with the second chamber R2. A third passage P3 extends from the second passage P2 and leads to an accumulator 17, which reserves hydraulic oil, by way of a check valve 18. The accumulator 17 compensates for loss of hydraulic oil, due to leakage or other reasons. A throttle valve 19 is arranged in the second passage P2.

The electromagnetic switch valve 14 has a solenoid 14a and a spool, which is shifted between a first position 15 and a second position 16 by the solenoid 14a. A controller is installed in front of an operator cabin (FIG. 5) to control the electromagnetic switch valve 14. The spool is shown at the first position in FIG. 4. In this state, the movement of hydraulic oil between the first and second chambers R1, R2 is prohibited to lock the piston 13b in the housing 13a. This, in turn, locks, or restricts, pivoting of the rear axle 10. If the spool is moved to the second position 16, the movement of the hydraulic oil between the chambers R1, R2 is permitted. This unlocks the piston 13b and allows the rear axle 10 to pivot freely. The damper 13, the electromagnetic switch valve 14, and the hydraulic circuit therebetween forms a locking device.

As shown in FIG. 3, a yaw rate sensor 21, a vehicle velocity sensor 22, fork position sensors 23, 24, a pressure sensor 25, and a pivot angle sensor 26 are installed in the forklift 1. The sensors 2–26 detect the current operation status and load status of the forklift 1. Each sensor 21–26 is connected to the controller 20.

The yaw rate sensor 21 detects the yaw rate (angular velocity) Y (rad/sec) of the forklift 1. A gyroscope (e.g., piezoelectric type, or an optical type gyroscope) may be employed as the yaw rate sensor 21. The vehicle velocity sensor 22 detects the rotating speed of the differential gear 8 and thus indirectly detects the velocity V of the forklift 1.

The first and second fork position sensors 23, 24 are each attached to the outer masts 2 at different heights. Limit switches may be employed as the fork position sensors 23, 24. The forks 4 may be lifted to a maximum height $H_{max}$ of about six meters. The first fork position sensor 23 is actuated when the forks 4 are lifted to a height of two meters or higher and de-actuated when the forks 4 are located below the height of two meters. The second fork position sensor 24 is actuated when the forks 4 are lifted to a height of four meters or higher and de-actuated when the forks 4 are located below the height of four meters. Thus, the states of the two position sensors 23, 24 indicate the zone in which the forks 4 are located. The forks 4 are located in a low zone when positioned between a height of zero meters to two meters, an intermediate zone when positioned between a height of two meters to four meters, and a high zone when positioned at a height of four meters or higher. The controller 20 determines which zone the forks 4 are located in.

The pressure sensor 25 is arranged at the bottom portion of the lift cylinder 6 to detect the hydraulic pressure in the cylinder 6. The weight w of the load carried on the forks 4 is obtained from the detected hydraulic pressure.

As shown in FIGS. 3 and 4, the pivot angle sensor 26 is supported at one side of the body 1a. A potentiometer may be employed as the pivot angle sensor 26. Pivoting of the rear axle 10 is converted to rotary movement by a link mechanism 27. The pivot angle sensor 26 detects the rotary movement to obtain the pivot angle θ. A signal representing the detected motion is transmitted to the controller 20. The pivot angle θ is included in the range of −4° to 4°.

Figure 1:
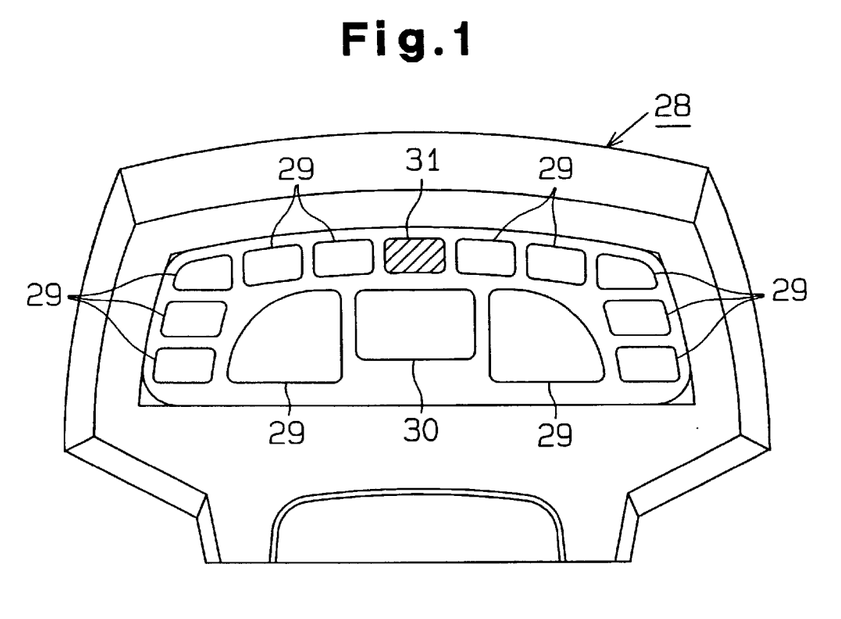
FIG. 1 is a plan view showing an instrument panel employed in a first embodiment according to the present invention.

An instrument panel 28, which is shown in FIG. 1, is installed in the cabin. Indicators 29, which include various type of warning lights (warning lamps), and a liquid crystal display 30, which displays predetermined information with symbols and characters, are arranged on the instrument panel 28. An axle warning lamp 31 for warning the operator of an abnormality in the axle pivot control apparatus is also arranged on the instrument panel 28.

Figure 2:
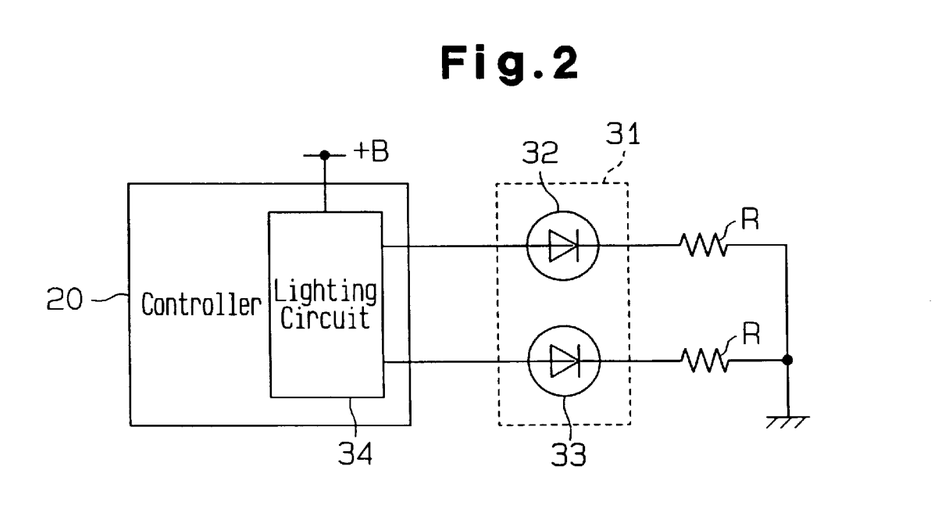
FIG. 2 is a circuit diagram showing the electric structure of the instrument panel of FIG. 1.

As shown in FIG. 2, the warning lamp 31 includes a first light-emitting diode (LED) 32 and a second light-emitting diode (LED) 33. The first LED 32 emits a red light while the second LED 33 emits a green light. The color of the warning lamp 31 is determined by the combination of the lights emitted by the first and second LEDs 32, 33. If the first LED 31 is lit solely, the warning lamp 31 emits a red light. If the second LED 33 is lit solely, the warning lamp 31 emits a green light. If the first and second LEDs are lit together, the warning lamp 31 emits a yellow light, which is the combination color of red and green. A green LED and a red LED are selected since these colors and its combination color each have a different hue. Thus, each color is easily distinguished from the others.

The controller 20 incorporates a lighting circuit 34. The LEDs 32, 33 each have an anode, which is connected to the lighting circuit 34, and a cathode, which is grounded by way of a resistor R. A battery (not shown) applies an electric potential of +B to the lighting circuit 34. The lighting circuit 34 incorporates two switch elements (not shown). Each switch element is associated with one of the LEDs 32, 33 to actuate or de-actuate the LED 32, 33. There are three possible combinations for the actuation of the LEDs 32, 33. The first combination is only the first LED 32 being lit. The second combination is only the second LED 33 being lit. The third combination is both first and second LEDs 32, 33 being lit. Accordingly, the color of the light emitted by the warning lamp 31 depends on the status of the two switch elements.

As shown in FIG. 3, an actuating switch 35 is connected to the controller 20. The actuating switch 35 is manually shifted between either an OFF position or an ON position.

When the actuating switch 35 is shifted to the OFF position, the axle pivot control apparatus is de-actuated thus enabling the rear axle 10 to pivot freely. When the actuating switch 35 is shifted to the ON position, the axle pivot control apparatus is actuated to control pivoting of the rear axle 10.

Figure 6:
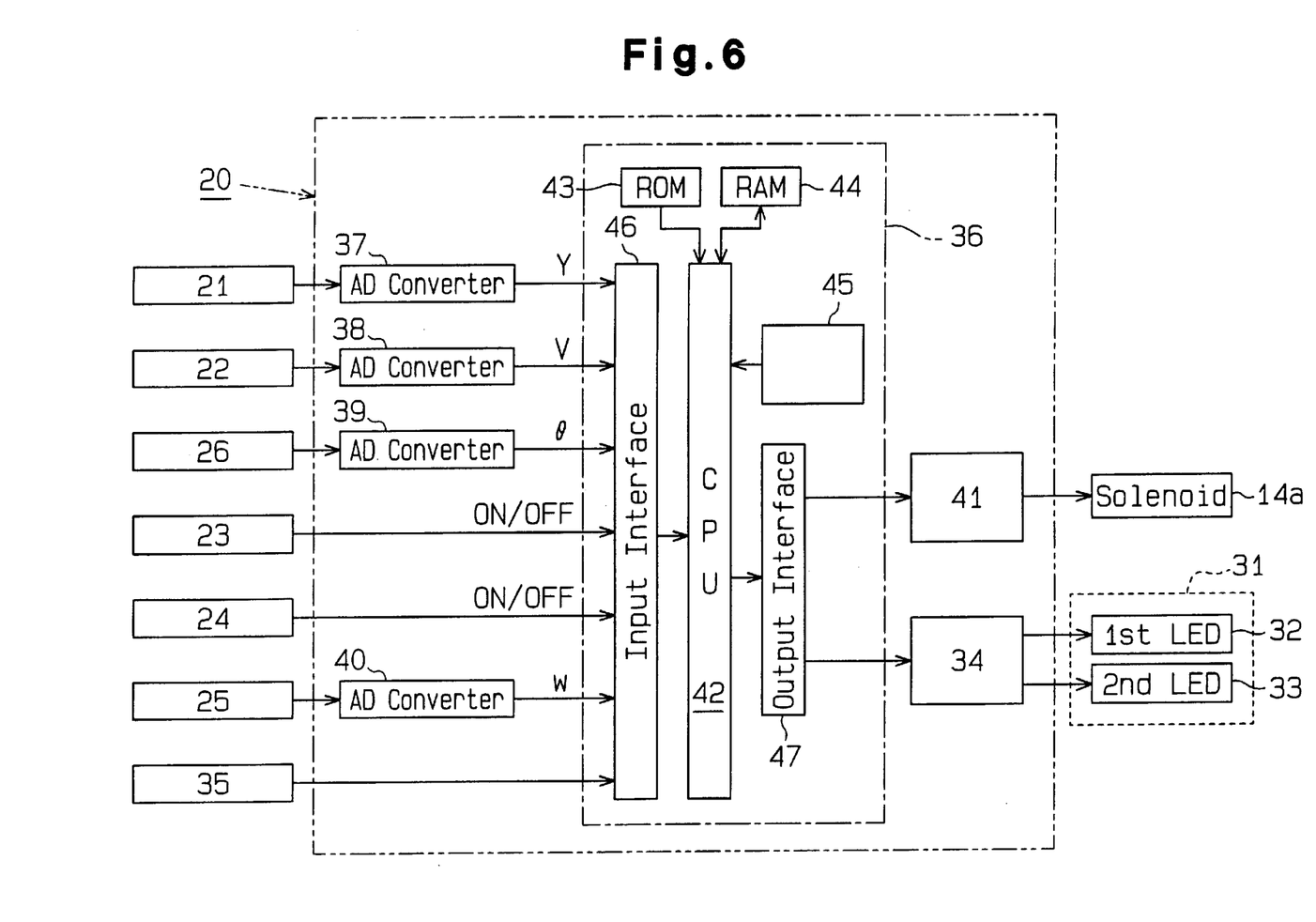
FIG. 6 is a block diagram showing the flow of electric signals in the axle pivot control apparatus.

The electric structure of the axle pivot control apparatus will now be described with reference to FIG. 6. The controller 20 incorporates a microcomputer 36, analog-to-digital (AD) converter circuits 37, 38, 39, 40, the lighting circuit 34, and an actuator 41. The microcomputer 36 includes a central processing unit (CPU) 42, a read only memory (ROM) 43, a random access memory (RAM) 44, a clock circuit 45, an input interface 46, and an output interface 47. Signals representing the values detected by the sensors 21, 22, 25, 26 are sent to the AD converter circuits 37, 38, 39, 40, respectively.

The signals from the fork position sensors 23, 24 and the actuating switch 35 are sent to the CPU 42. If the actuator 41 receives a de-excitation command from the CPU 42, the actuator 41 impedes the flow of current to the solenoid 14$a$ and moves the spool of the electromagnetic switch valve 14 to the first position 15. On the other hand, if the actuator 41 receives an excitation command from the CPU 42, the actuator 41 commences the flow of current to the solenoid 14$a$ and moves the spool of the electromagnetic switch valve 14 to the second position 16. Accordingly, the electromagnetic switch valve 14 is controlled by signals sent to the actuator 41 from the CPU 42.

Figure 9:
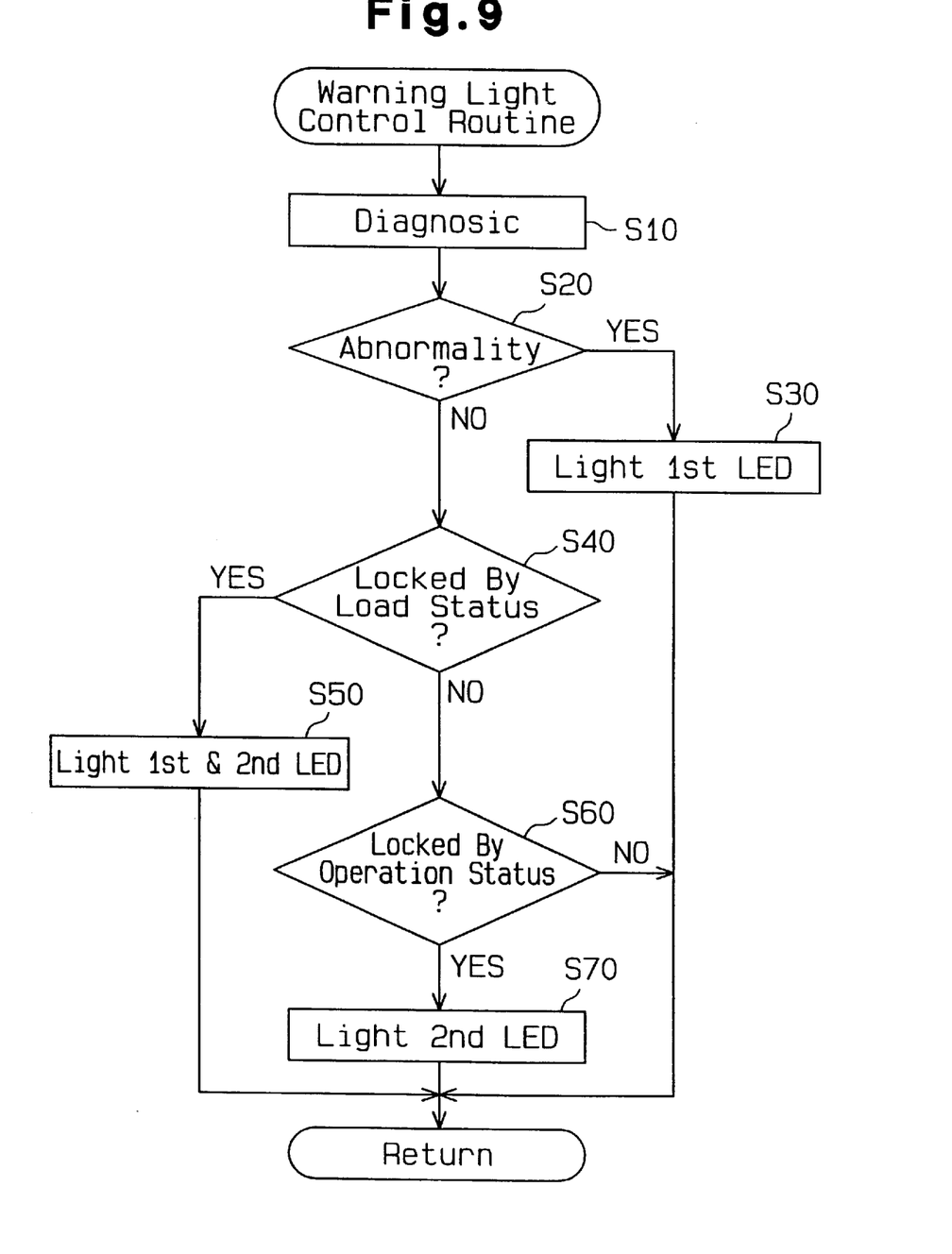
FIG. 9 is a flowchart showing a warning light control routine.

The ROM 43 stores a program used to control pivoting of the axle and another program used to control the warning light (refer to FIG. 9). When the actuating switch 35 is located at the ON position, the CPU 42 executes these programs in a cyclic manner at predetermined time intervals (e.g., 10 to 90 milliseconds). The warning light control routine is executed to control the warning lamp 31 and will described later.

The axle pivot control routine will first be described. The CPU 42 first reads the yaw rate Y, the vehicle velocity V, the load weight w, and the pivoting angle $\theta$. The CPU 42 also determines the vertical position H of the forks 4 based on the signals sent from the fork position sensors 24, 25. The CPU 42 then judges whether the load carried on the forks 4 is light or heavy. If the value of the load weight w is lower than a reference value $w_o$ (w<$w_o$), the load is light. On the other hand, if the value of the load weight w is equal to or higher than a reference value $w_o$ (w$\geq$$w_o$), the load is heavy.

Figure 7:
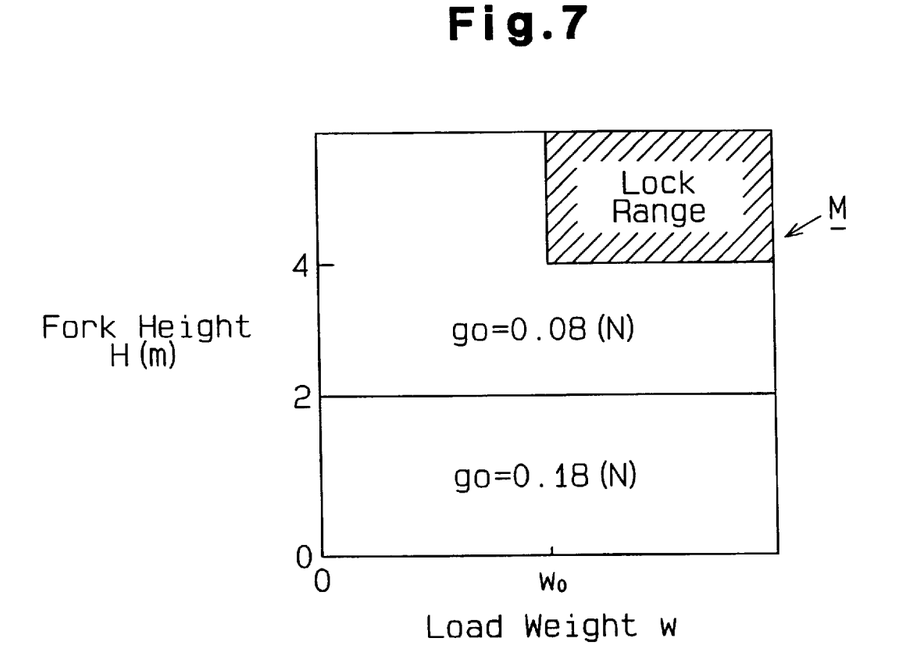
FIG. 7 is a map used when restricting pivoting of the axle.
Figure 8:
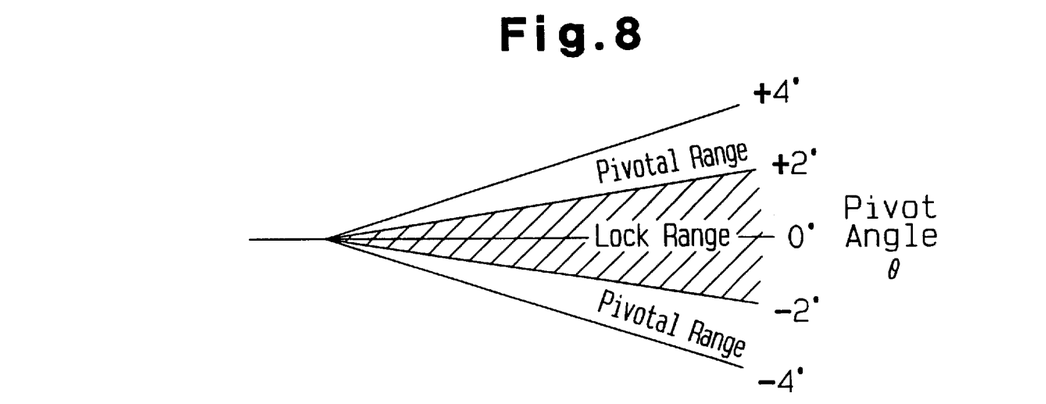
FIG. 8 is a diagram showing the ranges in which pivoting of the axle is permitted and prohibited.

The CPU 42 determines the operation status of the forklift by computing a lateral acceleration $G_s$ and a yaw acceleration $\Delta Y/\Delta T$, which indicates the rate of change of the yaw rate Y, based on the signals sent from the sensors 21–29. The lateral acceleration $G_s$ is computed from the yaw rate Y and the vehicle velocity V using the equation $G_s=V\times Y$. The yaw acceleration $\Delta Y/\Delta T$ is computed from the difference between the current yaw rate Y and the previous yaw rate Y, which was obtained in the preceding cycle, relative to the elapsed time therebetween. The rear axle 10 is locked, or restricted from pivoting, either when the lateral acceleration $G_s$ exceeds its threshold value $g_o$ or when the yaw acceleration $\Delta Y/\Delta T$ exceeds its threshold value $y_o$. The threshold value $g_o$ of the lateral acceleration $G_s$ is selected by referring to a map M, which is illustrated in FIG. 7.

The threshold value $g_o$ is set at a first value (e.g., 0.18N) when the vertical position H of the forks 4 is lower than a height of two meters and set at a second value (e.g., 0.08N) when the vertical position H of the forks 4 is located at a height of two meters or higher. The threshold values $g_o$, $y_o$ are determined through experiments and theoretical calculations and differ in accordance with the type of vehicle or other factors. Reference to the yaw acceleration $\Delta Y/\Delta T$ when determining the operation status of the forklift 1 enables pivoting of the rear axle 10 to be restricted before the lateral acceleration $G_s$ becomes too high and also continuously restricts pivoting of the rear axle 10 when the forklift changes directions.

The CPU 42 also judges whether or not the vehicle's center of gravity is raised (a state in which a heavy load is lifted to a high position). If it is determined that the center of gravity is raised, that is, if the state of the load is in a lock range (FIG. 7), the CPU 42 locks the rear axle 10. However, if the absolute value of the rear axle pivot angle $\theta$ exceeds 2°, the rear axle 10 remains unlocked even when the load status is in the lock range. This is to prevent locking of the rear axle 10 when one of the rear wheels 11 rides over a bump. If the rear axle 10 is locked while one is raised by a bump, the elevated wheel 11 will remain elevated even if the wheel 11 is moved to a level surface. If the absolute value of the pivot angle $\theta$ is 2° or lower, the elevated rear wheel 11 will descend onto the road surface regardless of the rear axle 10 being locked.

The CPU 42 stores three flags $F_g$, $F_y$, and $F_n$. Flag $F_g$ is set when the lateral acceleration $G_s$ exceeds its threshold value $g_o$. Flag $F_y$ is set when the yaw acceleration $\Delta Y/\Delta T$ exceeds its threshold value $y_o$. Flag $F_n$ is set when the absolute value of the pivot angle $\theta$ is 2° or lower while the load status is included in the lock range. In other words, the flags $F_g$, $F_y$, and $F_n$ are set when the rear axle 10 should be locked.

The warning light control routine will now be described. Testing of the axle pivot control apparatus is carried out during the warning light control routine to test for abnormalities. Thus, if the rear axle 10 remains unlocked while it should be locked, the axle pivot control apparatus is diagnosed as having an abnormality.

The warning lamp 31 emits a red light when there is an abnormality. If the operation status (lateral acceleration $G_s$ and yaw acceleration $\Delta Y/\Delta T$) meets the axle locking conditions, the warning lamp 31 emits a green light. If the load status (weight w and position H) meets the axle locking condition, the warning lamp 31 emits a yellow light. The operator can thus distinguish three types of information from these three colors. The warning light control routine is executed in accordance with the flowchart illustrated in FIG. 9.

As shown in FIG. 9, the microcomputer 36 first performs step S10 to carry out testing of the axle pivot control apparatus. The testing includes two processes. In the first process, sensors are tested for abnormalities. For example, if the value of the vehicle velocity is zero but the value of the yaw rate Y is not, the microcomputer 36 determines that there is an abnormality in the related sensors. In the second process, the locking device is tested for abnormalities. More specifically, the microcomputer 36 determines whether the rear axle 10 is locked when it should be. For example, the microcomputer 36 monitors changes in the pivot angle $\theta$ when the rear axle 10 should be locked. If changes in the pivot angle $\theta$ are detected, the microcomputer 36 determines that there is an abnormality in the axle pivot control apparatus. If an abnormality is found during any one of the two testing processes, this indicates that the axle pivot control apparatus, which includes the sensors tested in the first process and the locking device tested in the second process, is not functioning properly.

At step S20, the microcomputer 36 determines whether or not the axle pivot control apparatus has an abnormality. If it is determined that there is an abnormality, the microcomputer 36 proceeds to step S30 and lights the first LED 32 so that the warning lamp 31 emits a red color. If it is determined in step S20 that there is no abnormalities, the microcomputer 36 proceeds to step S40.

At step S40, the microcomputer 36 determines whether the vehicles's center of gravity is raised, that is, whether the load status is included in the lock range. The microcomputer 36 determines that the load status is in the lock range if the flag $F_n$ is set and that the load status is outside the lock range if the flag $F_n$ is not set. If it is determined that the load status is in the lock range, the microcomputer 36 proceeds to step S50 and lights both the first LED 32 and the second LED 33 so that the warning lamp 31 emits a yellow color. If it is determined that the load status is not in the lock range in step S40, the microcomputer 36 proceeds to step S60.

At step S60, the microcomputer 36 determines whether or not the rear axle 10 is being locked due to the operation status of the forklift 1. In other words, the microcomputer 36 determines that the rear axle 10 is in a locked state if either flag $F_g$ or flag $F_y$ is set. If neither flag $F_g$ or flag $F_y$ is set, the microcomputer 36 determines that pivoting of the rear axle 10 is permitted. If it is determined that the rear axle 10 is locked, the microcomputer 36 proceeds to step S70 and lights the second LED 33 so that the warning lamp 31 emits a green color. The microcomputer 36 then completes the present routine cycle. If it is determined that the rear axle 10 is not locked in step S60, the microcomputer 36 completes the present routine cycle.

As described above, the color of the warning lamp 31 when the rear axle 10 is locked due to the load status differs from that when the rear axle 10 is locked due to the operation status of the forklift 1. When the warning lamp 31 emits a yellow light or a green light, the rear axle 10 is locked. In this state, the operator may rely on the axle pivot control apparatus when maneuvering the forklift 1 and handling loads. However, if the warning lamp 31 emits a yellow light, this indicates that the operator should take precautions when steering the forklift 1 or when handling loads. If the warning lamp 31 emits a green color, this indicates that the operator should take precautions when steering the forklift 1. Accordingly, the color of the light emitted by the warning lamp 31 advises what precautions the operator should take if necessary. Furthermore, the warning lamp 31 emits a red light when there is an abnormality in the axle pivot control apparatus. Thus, the operator is immediately notified of an abnormality if one occurs.

The warning lamp 31 turns into various different colors. Thus, the operator is warned of an occurrence of an abnormality and notified whether the rear axle 10 is in a locked state by the same warning lamp 31. Accordingly, the space occupied by the warning lamp 31 need not be increased. This is significant since the space provided for the instrument panel 28 is limited.

The warning lamp 31 emits light of three different colors. That is, the warning lamp 31 emits the color of the first LED 32, the color of the second LED 33, and the combination color of these colors. Thus, in addition to being warned of an abnormality in the axle pivot control apparatus, the operator can learn why the rear axle 10 is being locked.

The LEDs 32, 33 are selected such that they emit colors that are clearly distinguished from one another when lit. If the LEDs 32, 33 are lit independently, the first LED 32 emits a red light and the second LED 33 emits a green light. The LEDs 32, 33 emit a combination color of yellow when lit together. Therefore, different information is accurately communicated to the operator.

Signals sent from the pivot angle sensor 26 are used during testing of the axle pivot control apparatus. Thus, separate sensors for testing purposes need not be employed.

The yaw rate sensor 21 and the vehicle velocity sensor 22 are tested for abnormalities by comparing the signals sent from these sensors. Thus, separate sensors for testing purposes need not be employed.

It should be apparent to those skilled in the art that the present invention may be embodied in many other specific forms without departing from the spirit or scope of the invention. More particularly, the present invention may be embodied as described below.

In the preferred and illustrated embodiment, the warning lamp 31 emits light of three different colors. However, if the axle pivot control apparatus is functioning properly, the warning lamp 31 may be lit by another color. For example, a further color may be used to indicate that pivoting of the rear axle 10 is permitted due to the absolute value of the pivot angle θ exceeding 2° despite the forks 4 being lifted to a high position while carrying a heavy load. Accordingly, if the warning lamp 31 is lit by the further color, this would notify the operator that the rear axle 10 is free to pivot despite the heavy load being lifted to a high position. Thus, the operator can take the necessary precautions when handling the load.

In the preferred and illustrated embodiment, the warning lamp 31 may be lit by a further color to indicate that the actuating switch 35 has been turned off and pivoting of the rear axle 10 will thus not be controlled. This lets the operator know that pivoting of the rear axle 10 will not be restricted.

The warning lamp 31 may be lit such that it emits different colors when pivoting of the rear axle 10 is prohibited and when pivoting of the rear axle 10 is permitted. This notifies the operator of the state of the rear axle 10.

Two LEDs are employed in the preferred and illustrated embodiment. However, more than two LEDs may be employed.

For example, the warning lamp 31 may be lit by three LEDs. In such case, the warning lamp 31 emits light of four or more different colors. Thus, the operator can be informed of four or more types of different information. The combination of a red LED, a green LED, and a blue LED will produce a maximum of seven different colors.

In the preferred and illustrated embodiment, the LEDs 32, 33 emit a red light or a green light. However, the colors of the LEDs 32, 33 are not limited to these two colors. For example, a red LED and a blue LED may be used together. Alternatively, a green LED and a blue LED may be used together.

The light emitting body accommodated in the warning light is not limited to an LED. For example, a bulb or a miniature fluorescent tube may be used instead.

A compact color liquid crystal display device may be employed as the warning light. In such case, the color shown on the liquid crystal display device changes.

The warning lamp 31 may be constructed by a single light emitting body that emits a white light through a plurality of different color filters. In such case, the color of the warning lamp 31 is changed by selecting the appropriate color filter or color filters.

The warning lamp 31 incorporates two light emitting bodies and is thus capable of emitting three different colors.

Thus, if there are two different types of information including information regarding to abnormalities, two colors may be selected to indicate the two different type of information simultaneously.

Testing of the axle pivot control apparatus may be performed by testing the fork position sensors or the pressure sensor, which are employed to detect the status of the carried load.

In the preferred and illustrated embodiment, the detected pivot angle θ is used to detect abnormalities related to pivoting of the rear axle 10. However, abnormalities may be detected by using additional sensors. For example, the movement of the damper piston rod 13c may be detected by a sensor to test for abnormalities.

Abnormalities in the locking and unlocking of the rear axle may also be tested. For example, the position of the spool in the electromagnetic switch valve 14 may be detected to judge whether the rear axle 10 should be locked or unlocked.

In the preferred and illustrated embodiment, different colors are used for each type of information. The color used to indicate that the rear axle is locked due to the operation status differs from that used to indicate that the rear axle is locked due to the load status. However, the color is not limited to one for each type of information. For example, different colors may be used to indicate different types of abnormalities. Alternatively, locking of the rear axle 10 may be indicated by a single color regardless of whether the rear axle 10 is locked by the operation status of the load status.

Any type of sensor can be used to estimate the lateral acceleration and the yaw acceleration. For example, instead of using a yaw rate sensor, a tire angle detector may be employed to detect the steering angle (tire angle) of the rear wheels 11. In this case, the tire angle and the vehicle velocity V are used to compute the lateral acceleration $G_s(=V^2/r)$ and the yaw acceleration $\Delta Y/\Delta T(=V \cdot \Delta(1/r)/\Delta T)$. When calculating the yaw acceleration $\Delta Y/\Delta T$, r represents the turning radius of the vehicle. Alternatively, the values detected by an acceleration sensor and a yaw rate sensor may be used to calculate the lateral acceleration $G_s$ and the yaw acceleration $\Delta Y/\Delta T$.

Lateral acceleration may be relied on as the sole physical quantity indicative of the operation status. The yaw acceleration does not necessarily have to be used. Furthermore, the rate in which the lateral acceleration fluctuates ($\Delta G/\Delta T$) may be used in lieu of the yaw acceleration $\Delta Y/\Delta T$.

In the preferred and illustrated embodiment, pivoting of the rear axle 10 is restricted by the operation status and by the load status. However, the axle pivot control apparatus may be constructed such that the rear axle 10 is locked solely by either one of these conditions.

In the preferred and illustrated embodiment, the pivot angle θ of the rear axle 10 is referred when judging whether to restrict pivoting. However, the pivot angle θ does not necessarily have to be referred to when locking the rear axle 10.

In the preferred and illustrated embodiment, the warning lamp 31 can be continually turned on and off to indicate information. For example, the warning lamp 31 can be lit constantly or turned on and off depending on the type of abnormality. Furthermore, the lighting pattern of the warning lamp 31 may be used to convey three types of information even when using only one color. For example, a first piece of information may be conveyed by turning the warning lamp 31 on and off continually, a second piece of information by continuously turning on the warning lamp 31, and a third piece of information by turning off the warning lamp 31.

Therefore, the present examples and embodiments are to be considered as illustrative and not restrictive, and the invention is not to be limited to the details given herein, but may be modified within the scope and equivalence of the appended claims.

What is claimed is:

1. An industrial vehicle, including an axle to which wheels are mounted and supported to pivot vertically relative to a body of the vehicle, and a pivot control apparatus for controlling pivoting of the axle, wherein the pivot control apparatus is actuated when the motion of the vehicle meets predetermined operation conditions or when the status of a load carried by the vehicle meets predetermined load conditions, wherein the industrial vehicle comprises:

a determiner for determining whether an abnormality has occurred in the pivot control apparatus;

a warning lamp having two or more different modes, wherein the modes include an abnormality mode for indicating the occurrence of an abnormality in the pivot control apparatus and a normality mode for indicating normal functioning of the pivot control apparatus, wherein the warning lamp further operates in a plurality of actuation modes, which include a motion actuation mode, which indicates that the pivot control apparatus has been actuated due to the current motion of the vehicle, and a load actuation mode, which indicates that the pivot control apparatus has been actuated due to the current status of the load; and a notifier for notifying an operator of two or more different pieces of information using the warning lamp, wherein the warning lamp enters the abnormality mode to indicate the occurrence of an abnormality when the determiner determines that an abnormality has occurred in the pivot control apparatus, and the warning lamp enters the normality mode to indicate normal functioning of the pivot control apparatus when the determiner determines that the pivot control apparatus is functioning normally and, when the pivot control apparatus is activated, the notifier controls the warning lamp to operate in the actuation mode that corresponds to the current cause of actuation of the pivot control apparatus after the determiner determines that the pivot control apparatus is functioning normally.

2. The industrial vehicle according to claim 1, wherein the warning lamp has at least two light emitting bodies, each representing a different mode.

3. The industrial vehicle according to claim 2, wherein the notifier lights the light emitting bodies independently or simultaneously such that the warning lamp switches between a number of modes equal to or greater than the number of light emitting bodies.

4. The industrial vehicle according to claim 1, wherein the modes are each represented by light emission of a different color.

5. The industrial vehicle according to claim 1, wherein the modes are each represented by a different lighting pattern of the warning lamp.

6. An industrial vehicle comprising:

an axle to which wheels are mounted and supported to pivot vertically relative to a body of the vehicle;

a locking mechanism for restricting pivotal movement of the axle when actuated;

a detector for detecting the nature of the vehicle's motion or status of a load carried by the vehicle;

a controller for controlling actuation of the locking mechanism in accordance with the status detected by the detector, wherein the locking mechanism is actuated when the motion of the vehicle meets predetermined operation conditions or when the status of a load carried by the vehicle meets predetermined load conditions;

a determiner for determining whether an abnormality has occurred in the locking mechanism based on the detection results of the detector;

a warning lamp having two or more different modes, wherein the modes include an abnormality mode for indicating the occurrence of an abnormality in the locking mechanism and a normality mode for indicating normal functioning of the locking mechanism, wherein the warning lamp further operates in a plurality of actuation modes, which include a motion actuation mode, which indicates that the locking mechanism has been actuated due to the current motion of the vehicle, and a load actuation mode, which indicates that the locking mechanism has been actuated due to the current status of the load; and a notifier for notifying an operator of two or more different pieces of information using the warning lamp, wherein the warning lamp enters the abnormality mode to indicate the occurrence of an abnormality when the determiner determines that an abnormality has occurred in the locking mechanism, and the warning lamp enters the normality mode to indicate normal functioning of the locking mechanism when the determiner determines that the locking mechanism is functioning normally, and, when the locking mechanism is activated, wherein the notifier controls the warning lamp to operate in the actuation mode that corresponds to the current cause of actuation of the locking mechanism after the determiner determines that the locking mechanism is functioning normally.

7. The industrial vehicle according to claim 6, wherein the warning lamp has at least two light emitting bodies, each representing a different mode.

8. The industrial vehicle according to claim 7, wherein the notifier lights the light emitting bodies independently or simultaneously such that the warning lamp switches between a number of modes equal to or greater than the number of light emitting bodies.

9. The industrial vehicle according to claim 6, wherein the modes are each represented by light emission of a different color.

10. The industrial vehicle according to claim 6, wherein the modes are each represented by a different lighting pattern of the warning lamp.

11. The industrial vehicle according to claim 6, wherein the locking mechanism is a hydraulic cylinder-piston mechanism and a valve, the hydraulic cylinder-piston mechanism being connected to the axle and the body.

12. The industrial vehicle according to claim 6, wherein the detector is a yaw sensor fixed to the vehicle.

13. The industrial vehicle according to claim 6, wherein the detector is a height sensor for sensing the location of the load carried by the vehicle.

14. An industrial vehicle comprising:

an axle to which wheels are mounted and supported to pivot vertically relative to a body of the vehicle;

a locking mechanism for restricting pivotal movement of the axle when actuated;

a detector for detecting the nature of the vehicle's motion and the status of a load carried by the vehicle;

a controller for controlling actuation of the locking mechanism in accordance with the status detected by the detector, wherein the locking mechanism is actuated when the motion of the vehicle meets predetermined operation conditions or when the status of a load carried by the vehicle meets predetermined load conditions;

a determiner for determining whether an abnormality has occurred in the locking mechanism based on the detection results of the detector;

a warning lamp including an abnormality indicating mode for indicating the occurrence of an abnormality in the locking mechanism, a motion actuation indicating mode for indicating that the locking mechanism has been actuated due to the current motion of the vehicle, and a load actuation indicating mode for indicating that the locking mechanism has been actuated due to the current status of the load; and a notifier for notifying an operator of the current condition of the pivot control apparatus by controlling the warning lamp.

15. The industrial vehicle according to claim 14, wherein the notifier lights the warning lamp in the abnormality indicating mode when an abnormality has occurred in the locking mechanism, wherein the notifier lights the warning lamp in the motion actuation mode when the locking mechanism has been actuated due to the current motion of the vehicle, and wherein the notifier lights the warning lamp in the load actuation indicating mode when the locking mechanism has been actuated due to the current status of the load.

16. The industrial vehicle according to claim 14, wherein the warning lamp has at least two light emitting bodies, each representing a different mode.

17. The industrial vehicle according to claim 16, wherein the notifier lights the light emitting bodies independently or simultaneously such that the warning lamp switches between a number of modes equal to or greater than the number of light emitting bodies.

18. The industrial vehicle according to claim 14, wherein the modes are each represented by light/emission of a different color.

19. The industrial vehicle according to claim 14, wherein the modes are each represented by a different lighting pattern of the warning lamp.

* * * * *

UNITED STATES PATENT AND TRADEMARK OFFICE
CERTIFICATE OF CORRECTION

PATENT NO. : 6,209,913 B1
DATED : April 3, 2001
INVENTOR(S) : Kazuo Ishikawa et al.

It is certified that error appears in the above-identified patent and that said Letters Patent is hereby corrected as shown below:

Column 1,
Line 21, please change "to restrict futher" to -- to restrict further --;
Lines 28-29 there should not be a new paragraph, please change "of the forks. The axle is locked" to -- of the fork. The axle is locked --;
Line 36, please change "abnormalites" to -- abnormalities --;

Column 3,
Line 11, please change "along the inner mast" to -- along the inner mast 3. --;
Lines 39-40, please change "A controller is installed" to -- A controller 20 is installed --;
Line 55, please change "The sensors 2-26 detect" to -- The sensors 21-26 detect --;

Column 8,
Lines 41-42, there should not be a new paragraph, please change "employed. For example," to -- employed. For example, --;

Column 9,
Line 3, please change "two different type" to -- two different types --;

Column 12,
Line 51, please change "represented by light/emission of a" to -- represented by light emission of a --.

Signed and Sealed this

Twenty-third Day of April, 2002

*Attest:*

*Attesting Officer*

JAMES E. ROGAN
*Director of the United States Patent and Trademark Office*